(12) United States Patent
Knustad

(10) Patent No.: US 11,098,383 B2
(45) Date of Patent: Aug. 24, 2021

(54) CAST IRON INOCULANT AND METHOD FOR PRODUCTION OF CAST IRON INOCULANT

(71) Applicant: ELKEM ASA, Oslo (NO)

(72) Inventor: Oddvar Knustad, Kristiansand (NO)

(73) Assignee: ELKEM ASA, Oslo (NO)

( * ) Notice: Subject to any disclaimer, the term of this patent is extended or adjusted under 35 U.S.C. 154(b) by 298 days.

(21) Appl. No.: 16/314,116

(22) PCT Filed: Jun. 29, 2017

(86) PCT No.: PCT/NO2017/050175
§ 371 (c)(1),
(2) Date: Dec. 28, 2018

(87) PCT Pub. No.: WO2018/004357
PCT Pub. Date: Jan. 4, 2018

(65) Prior Publication Data
US 2019/0169705 A1    Jun. 6, 2019

(30) Foreign Application Priority Data
Jun. 30, 2016  (NO) .................................. 20161091

(51) Int. Cl.
*C21C 1/10* (2006.01)
*C22C 38/06* (2006.01)
(Continued)

(52) U.S. Cl.
CPC .............. *C21C 1/105* (2013.01); *C22C 28/00* (2013.01); *C22C 33/04* (2013.01); *C22C 33/08* (2013.01);
(Continued)

(58) Field of Classification Search
CPC ........... C21C 1/105; C21C 1/10; C22C 38/06; C22C 33/04; C22C 28/00; C22C 38/005;
(Continued)

(56) References Cited

U.S. PATENT DOCUMENTS 3,527,597 A    9/1970  Dawson et al.
4,432,793 A *  2/1984  Hilaire .................. C22C 35/005
                                                            148/322
(Continued)

FOREIGN PATENT DOCUMENTS

CN        101619372 A     1/2010
CN        103418757 A    12/2013
(Continued)

OTHER PUBLICATIONS

CN-104561735, machine translation. (Year: 2015).*
(Continued)

*Primary Examiner* — John A Hevey
(74) *Attorney, Agent, or Firm* — Lucas & Mercanti, LLP

(57) ABSTRACT

An inoculant for the manufacture of cast iron with lamellar, compacted or spheroidal graphite is disclosed. The inoculant has a particulate ferrosilicon alloy having about 40 to 80 wt % silicon, about 0.1 to 10 wt % calcium, 0 and 10% by weight of rare earths, for example cerium and/or lanthanum, and up to 5 wt % aluminium the balance being iron and incidental impurities in the ordinary amount, wherein the inoculant additionally has 0.1 to 10 wt %, based on the total weight of inoculant, antimony oxide where said antimony oxide is in particulate form and is mixed or blended with the ferrosilicon alloy particles, or is simultaneously added to cast iron together with the particulate ferrosilicon alloy particles.

14 Claims, 2 Drawing Sheets

(51) Int. Cl.
  *C22C 28/00* (2006.01)
  *C22C 38/00* (2006.01)
  *C22C 38/02* (2006.01)
  *C22C 33/08* (2006.01)
  *C22C 33/04* (2006.01)

(52) U.S. Cl.
  CPC .......... *C22C 38/002* (2013.01); *C22C 38/005* (2013.01); *C22C 38/02* (2013.01); *C22C 38/06* (2013.01)

(58) Field of Classification Search
  CPC ....... C22C 38/02; C22C 38/002; C22C 33/08; C22C 37/04; Y02P 10/20
  See application file for complete search history.

(56) References Cited

U.S. PATENT DOCUMENTS

| | | | |
|---|---|---|---|
| 5,733,502 A * | 3/1998 | Margaria | ................ C21C 1/105 420/578 |
| 6,102,983 A | 8/2000 | Skaland | |
| 2015/0284830 A1* | 10/2015 | Fay | ........................... C21C 1/08 420/578 |
| 2016/0047008 A1 | 2/2016 | Margaria et al. | |
| 2020/0340069 A1* | 10/2020 | Ott | ......................... C22C 37/10 |

FOREIGN PATENT DOCUMENTS

| | | | |
|---|---|---|---|
| CN | 104561735 A * | 4/2015 | |
| CN | 104561735 A | 4/2015 | |
| CN | 104561736 A | 4/2015 | |
| CN | 105121061 A | 12/2015 | |
| EP | 1126037 A1 | 8/2001 | |
| GB | 1296048 A | 11/1972 | |
| KR | 10-2015-0131087 A | 11/2015 | |
| RU | 2497954 C1 | 11/2013 | |
| RU | 2521915 C1 | 7/2014 | |
| SU | 872563 A1 | 10/1981 | |
| WO | 9524508 A1 | 9/1995 | |
| WO | 9929911 A1 | 6/1999 | |
| WO | WO-9929911 A1 * | 6/1999 | ............... C21C 1/10 |
| WO | 2006068487 A1 | 6/2006 | |

OTHER PUBLICATIONS

Examination Report dated Sep. 1, 2020 for corresponding Indian Patent Application No. 201947003121.
International Search Report and Written Opinion for Corresponding International Application No. PCT/NO2017/050174 (9 Pages) (dated Oct. 27, 2017).
International Search Report and Written Opinion for Corresponding International Application No. PCT/NO2017/050175 (12 Pages) (dated Oct. 18, 2017).
International Preliminary Report on Patentability for Corresponding International Application No. PCT/NO2017/050175 (12 Pages) (dated Jul. 25, 2018).
Search Report for Norwegian Patent Application No. 20161094 (2 Pages) (dated Jan. 30, 2017).
Search Report for Norwegian Patent Application No. 20161091 (2 Pages) (dated Jan. 5, 2018).
Zhe et al., "Influence of cooling rate and antimony addition content on graphite morphology and mechanical properties of ductile iron", China Foundry,2012, vol. 9. No. 2, pp. 114-118.
Glavas et al., "Effects of Antimony and Wall Thickness on Graphite Morphology in Ductile Iron Castings", Metal. Trans. B, 2016, vol. 47, No. 4, pp. 2487-2497.
Horie et al., "Effects of bismuth on nodule count in spheroidal graphite iron castings with thin section", Imono, 1988, vol. 60, No. 3 pp. 173-178. English abstract.
Office Action dated Mar. 12, 2020 for corresponding Canadian Patent Application No. 3,026,480.
Search Report dated Jul. 11, 2019 for Russian Patent Application No. 2019102411/02 (004287) (English translation only).
Office Action dated Aug. 3, 2020 for corresponding Korean Patent Application No. 10-2019-7002983.

* cited by examiner

CAST IRON INOCULANT AND METHOD FOR PRODUCTION OF CAST IRON INOCULANT

CROSS REFERENCE TO RELATED APPLICATION

This Application is a 371 of PCT/NO2017/050175 filed on Jun. 29, 2017 which, in turn, claimed the priority of Norwegian Patent Application No. 20161091 filed on Jun. 30, 2016, both applications are incorporated herein by reference.

TECHNICAL FIELD

The present invention relates to a ferrosilicon based inoculant for the manufacture of cast iron with lamellar, compacted or spheroidal graphite and to a method for production of the inoculant.

BACKGROUND ART

Cast iron is typically produced in cupola or induction furnaces, and generally contain between 2 to 4 percent carbon. The carbon is intimately mixed with the iron and the form which the carbon takes in the solidified cast iron is very important to the characteristics and properties of the iron castings. If the carbon takes the form of iron carbide, then the cast iron is referred to as white cast iron and has the physical characteristics of being hard and brittle which in certain applications is undesirable. If the carbon takes the shape of graphite, the cast iron is soft and machinable and is referred to as grey cast iron.

Graphite may occur in cast iron in the lamellar, compacted or spheroidal forms and variations thereof. The spheroidal form produces the highest strength and most ductile type of cast iron.

The shape, size and number density (number of nodules per $mm^2$) the graphite takes, as well as the amount of graphite versus iron carbide, can be controlled by certain additives that promote the formation of graphite during solidification of cast iron. These additives are referred to as inoculants and their addition to the cast iron as inoculation. In casting iron products from liquid iron, there will always be a risk for the formation of iron carbides in thin sections of castings. The formation of iron carbide is brought about by the rapid cooling of the thin sections as compared to the slower cooling of the thicker sections of the casting. The formation of iron carbide in a casting is referred to in the trade as "chill". The formation of chill is quantified by measuring "chill depth" and the power of an inoculant to prevent chill and reduce chill depth is a convenient way in which to measure and compare the power of inoculants.

In cast iron containing spheroidal graphite the power of inoculants is also commonly measured by the number density per unit area of spheroidal graphite particles in the as-cast condition. A higher number density per unit area of graphite spheroids means that the power of inoculation or graphite nucleation has been improved.

There is a constant need to find inoculants which reduce chill depth and improve the machinability of grey cast irons as well as increase the number density of graphite spheroids in ductile cast irons.

Since the exact chemistry and mechanism of inoculation and why inoculants function as they do is not completely understood, a great deal of research goes into providing the industry with new and improved inoculants.

It is thought that calcium and certain other elements suppress the formation of iron carbide and promote the formation of graphite. A majority of inoculants contain calcium. The addition of these iron carbide suppressants is usually facilitated by the addition of a ferrosilicon alloy and probably the most widely used ferrosilicon alloys are the high silicon alloys containing 70 to 80% silicon and the low silicon alloy containing 45 to 55% silicon.

The suppression of carbide formation is associated by the nucleating properties of the inoculant. By nucleating properties it is understood the number of nuclei formed by an inoculant. A high number of nuclei formed results in an increased graphite nodule number density and thus improves the inoculation effectiveness and improves the carbide suppression. Further, a high nucleation rate may also give better resistance to fading of the inoculating effect during prolonged holding time of the molten iron after inoculation.

U.S. Pat. No. 3,527,597 discovered that good inoculating power is obtained with the addition of between about 0.1 to 10% strontium to a silicon-bearing inoculant which contains less than about 0.35% calcium and up to 5% aluminium.

From WO 99/29911 it is known a cast iron inoculant showing an increased nucleation rate compared to the inoculant of U.S. Pat. No. 3,527,597. This inoculant is a ferrosilicon based inoculant containing between about 0.5 and 10% calcium and/or strontium and/or barium, less than 5% aluminium and between 0.5 and 10% oxygen in the form of one or more metal oxides and 0.5 and 10% sulphur in the form of metal sulphides.

In WO 99/29911 iron oxides, FeO, $Fe_2O_3$ and $Fe_3O_4$, are the preferred metal oxides. Other metal oxides mentioned in this patent are $SiO_2$, MnO, MgO, CaO, $Al_2O_3$, $TiO_2$ and $CaSiO_3$, $CeO_2$, $ZrO_2$.

U.S. Pat. No. 4,432,793 discloses an inoculant containing bismuth, lead and/or antimony, generally known as Spherix®. Bismuth, lead and/or antimony are known to have high inoculating power and to cause an increase in the number of nuclei. These elements are also known to be anti-spheroidizing elements, and the increasing presence of these elements in cast iron is known to cause degeneration of the spheroidal structure of graphite. Spherix® is a ferrosilicon containing from 0.005% to 3% rare earths and from 0.005% to 3% of one of the elements bismuth, lead and/or antimony. According to U.S. Pat. No. 5,733,502 Spherix® type inoculants always contain some calcium which improves the bismuth, lead and/or antimony yield at the time the alloy is produced and helping to distribute these elements homogeneously within the alloy, as these elements exhibit poor solubility in the iron-silicon phases. However, during storage the product tends to disintegrate and the granulometry tends toward an increased amount of fines. In U.S. Pat. No. 5,733,502 it was found that a ferrosilicon-based ferroalloy for inoculation containing (by weight %) from 0.005-3% rare earths, 0.005-3% bismuth, lead and/or antimony, 0.3-3% calcium and 0.3-3% magnesium, wherein the Si/Fe ratio is greater than 2, did not disintegrate, however for low silicon FeSi inoculants the product disintegrated during storage.

U.S. patent application No. 2015/0284830 relates to an inoculant alloy for treating thick ferrosilicon-based cast-iron parts, containing between 0.005 and 3 wt % of rare earths and between 0.2 and 2 wt % Sb. Said US 2015/0284830 discovered that antimony, when allied to rare earths in a ferrosilicon-based alloy, would allow an effective inoculation, and with the spheroids stabilized, of thick parts without the drawbacks of pure antimony addition to the liquid cast-iron. The inoculant according to US 2015/0284830 is described to be typically used in the context of an inoculation of a cast-iron bath, for pre-conditioning said cast-iron as well as a nodularizer treatment. An inoculant according to US 2015/0284830 contains (by wt %) 65% Si, 1.76% Ca, 1.23% Al, 0.15% Sb, 0.16% RE, 7.9% Ba and balance iron.

The production of an inoculant, wherein a small quantity of antimony is allied in a ferrosilicon based alloy, is relatively complicated. Due to the high atomic weight of antimony, the antimony will tend to sink to the bottom in the ferrosilicon melt, which may result in an inhomogeneous inoculant composition. Thus, reproducing the correct composition of such ferrosilicon based inoculant, comprising small quantities of antimony, may be difficult.

It is an object of the invention to provide a FeSi based inoculant containing antimony without the above disadvantages. Another object of the invention is to provide a homogeneous FeSi based inoculant containing antimony, which is not prone to disintegration whatever the Fe/Si ratio is. Yet another objective is to deliberately introduce a controlled amount of oxygen with the inoculant in the form of $Sb_2O_3$. These and other advantages with the present invention will become evident in the following description.

DISCLOSURE OF INVENTION

It has now been found that the addition of antimony oxide, $Sb_2O_3$, particles to the inoculant of WO 99/29911 instead of the other metal oxides and metal sulphide disclosed in WO 99/29911, surprisingly results in a significantly higher number of nuclei or nodule number density in cast irons, when adding said inoculant containing $Sb_2O_3$ particles to cast iron.

According to a first aspect the present invention relates to an inoculant for the manufacture of cast iron with lamellar, compacted or spheroidal graphite wherein said inoculant comprises a particulate ferrosilicon alloy comprising between about 40 to 80 wt % silicon, between about 0.1 to 10 wt % calcium, between 0 and 10% by weight of rare earths, for example cerium and/or lanthanum, and up to 5 wt % aluminium the balance being iron and incidental impurities in the ordinary amount, wherein said inoculant additionally comprises 0.1 to 10 wt % antimony oxide, based on the total weight of inoculant, where said antimony oxide is in particulate form and is mixed with the ferrosilicon alloy particles, or is simultaneously added to cast iron together with the particulate ferrosilicon alloy particles.

According to a first embodiment the ferrosilicon alloy comprises between 45 and 60% by weight of silicon.

According to a second embodiment the ferrosilicon alloy comprises between 60 and 80% by weight of silicon.

According to a third embodiment the ferrosilicon alloy comprises between 0.5 and 5% by weight of calcium.

According to a fourth embodiment ferrosilicon alloy comprises between 0.5 and 5% by weight aluminium.

According to a fifth embodiment the ferrosilicon alloy comprises up to 6% by weight of rare earths. In an embodiment the rare earths are cerium and/or lanthanum.

According to a sixth embodiment the inoculant comprises 0.2 to 5% by weight of particulate antimony oxide.

According to a seventh embodiment, the inoculant is in the form of a mixture or blend of the particulate ferrosilicon alloy and the antimony oxide particles.

According to an eight embodiment the inoculant is in the form of an agglomerated mixture of the particulate ferrosilicon alloy and the antimony oxide particles.

According to a ninth embodiment the inoculant is in the form of briquettes made from a mixture of the particulate ferrosilicon alloy and the antimony oxide particles.

According to a tenth embodiment the particulate ferrosilicon alloy and the particulate antimony oxide are added separately but simultaneously to the cast iron.

It has surprisingly been found that the inoculant according to the present invention containing antimony oxide results in an increased nodule number density when the inoculant is added to cast iron, thus obtaining an improved suppression of iron carbide formation using the same amount of inoculant as with conventional inoculants, or obtaining the same iron carbide suppression using less inoculant than when using conventional inoculants. In the present application, the novel inoculant was compared with conventional inoculants according to the prior art in WO 99/29911.

According to a second aspect the present invention relates to a method for producing an inoculant for the manufacture of cast iron with lamellar, compacted or spheroidal graphite, comprising: providing a particulate ferrosilicon alloy comprising 40 to 80 wt % silicon, between about 0.1 to 10 wt % calcium, between 0 and 10% by weight of rare earths, for example cerium and/or lanthanum, and up to 5 wt % aluminium the balance being iron and incidental impurities in the ordinary amount, and mixing with said particulate ferrosilicon alloy 0.1 to 10 wt % antimony oxide particles, based on the total weight of inoculant, to produce said inoculant.

According to a first embodiment of the method the ferrosilicon alloy comprises between 45 and 60% by weight of silicon.

According to a second embodiment of the method the ferrosilicon alloy comprises between 60 and 80% by weight of silicon.

According to a third embodiment of the method the ferrosilicon alloy comprises between 0.5 and 5% by weight of calcium.

According to a fourth embodiment of the method ferrosilicon alloy comprises between 0.5 and 5% by weight aluminium.

According to a fifth embodiment of the method the ferrosilicon alloy comprises up to 6% by weight of rare earths. In an embodiment the rare earths are cerium and/or lanthanum.

According to a sixth embodiment of the method the inoculant comprises 0.2 to 5% by weight of particulate antimony oxide.

According to a seventh embodiment of the method of the present invention the particulate antimony oxide is mixed with the particulate ferrosilicon alloy by mechanical mixing or blending.

According to an eight embodiment of the method the antimony oxide particles are mixed with the particulate ferrosilicon alloy by mechanical mixing or blending followed by agglomeration of the powder mixture by pressing with a binder, preferably sodium silicate solution. The agglomerates are subsequently crushed and screened to the required final product sizing. Agglomeration of the powder mixtures will ensure that segregation of the antimony oxide is eliminated.

DETAILED DESCRIPTION OF THE INVENTION

In the manufacturing process for producing cast iron with spheroidal graphite the cast iron melt is normally treated with a nodularizing agent, conventionally using an MgFeSi alloy, prior to the inoculation treatment. The nodularization treatment has the objective to change the form of the graphite from flake to nodule when it is precipitating and subsequently growing. The way this is done is by changing the interface energy of the interface graphite/melt. It is known that Mg and Ce are elements that change the interface energy, Mg being more effective than Ce. When Mg is added to a base iron melt, it will first react with oxygen and sulphur. It is only the "free magnesium" that will have a nodularizing effect. The nodularization reaction results in agitation, is violent and generates slag floating on the surface. The violence of the reaction will result in most of the nucleation sites for graphite that were already in the melt (introduced by the raw materials) and other inclusions being part of the slag on the top are removed. However some MgO and MgS inclusions produced during the nodularization treatment will still be in the melt. These inclusions are not good nucleation sites as such.

The primary function of inoculation is to prevent carbide formation by introducing nucleation sites for graphite. In addition to introducing nucleation sites, the inoculation also transforms the MgO and MgS inclusions formed during the nodularization treatment into nucleation sites by adding a layer (with Ca, Ba or Sr) on the inclusions.

In accordance with the present invention, the particulate FeSi base alloys should comprise from 40 to 80% by weight Si. The FeSi base alloy may be a high silicon alloy containing 60 to 80 wt %, e.g. 70 to 80 wt %, silicon or a low silicon alloy containing 45 to 60 wt %, e.g. 45-55 wt % silicon. The FeSi base alloy should have a particle size lying within the conventional range for inoculants, e.g. between 0.2 to 6 mm, e.g. 0.2 to 3 mm.

In accordance with the invention, the particulate FeSi based alloy comprises between 0.5 and 10% by weight of Ca. Using a higher amount of Ca may reduce the performance of the inoculant, increase slag formation and increase the cost. Good inoculating performance is achieved also when the amount of Ca in the FeSi base alloy is about 0.5-6% by weight. Preferably the amount of Ca in the FeSi base alloy is about 0.5-5% by weight.

The FeSi base alloy comprises up to 10% by weight of rare earths (RE). The RE may for example be Ce and/or La. In some embodiments the amount of RE should be up to 6% by weight. The amount of RE should preferably be at least 0.1% by weight. Preferably the RE is Ce and/or La.

Figure 3A:
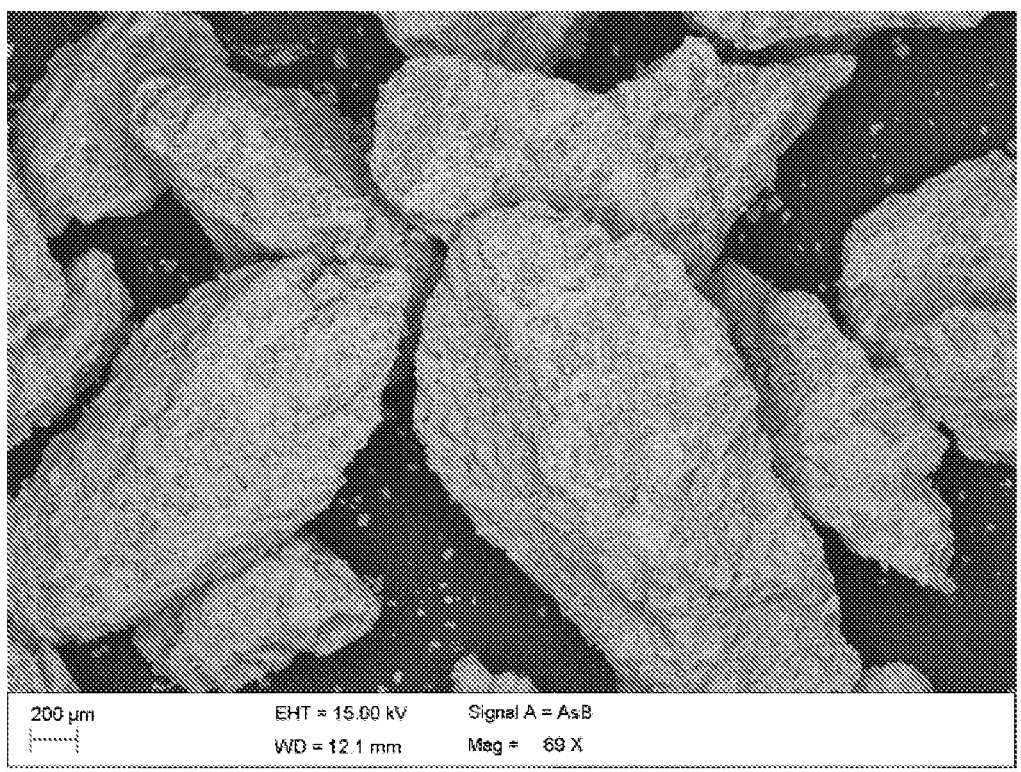
FIG. 3a-b show SEM photos of an inoculant according to the present invention; FeSi coated with $Sb_2O_3$ powder.
Figure 3B:
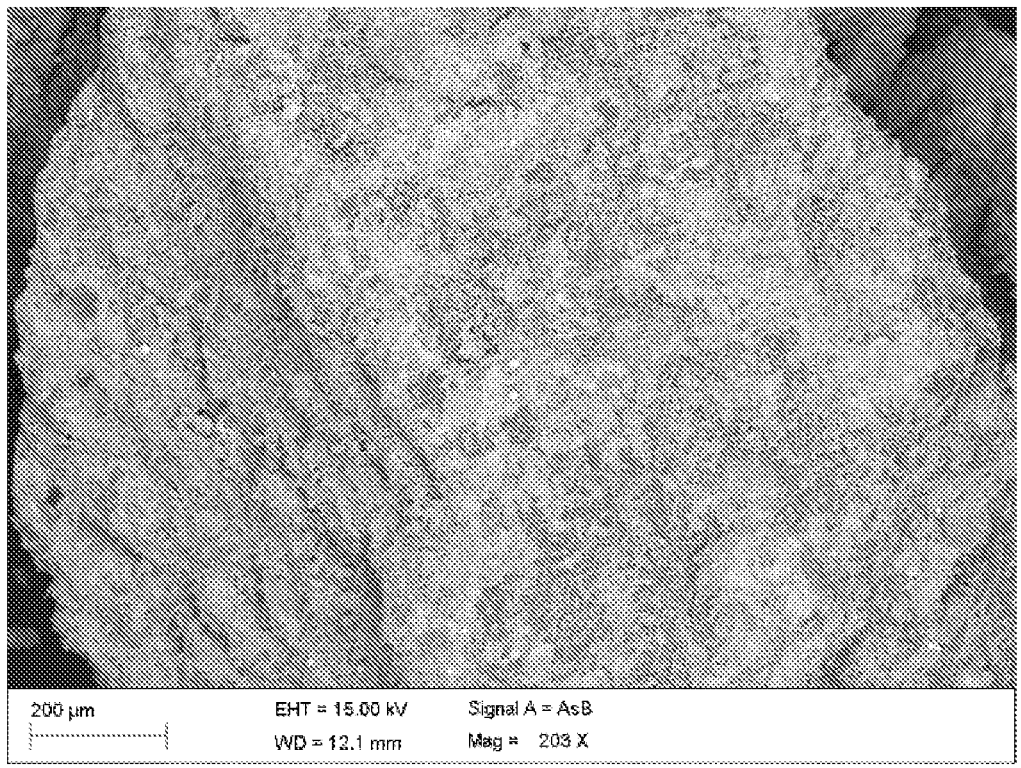

The $Sb_2O_3$ particles should have a small particle size, i.e. micron size, e.g. 10-150 μm, resulting in very quick melting and/or dissolution of the $Sb_2O_3$ particles when introduced in the cast iron melt. Advantageously, the $Sb_2O_3$ particles are mixed with the particulate FeSi base alloy prior to adding the inoculant into the cast iron melt. The FeSi particles are completely covered by the $Sb_2O_3$ particles, see FIG. 3. Mixing the $Sb_2O_3$ particles with the FeSi base alloy particles results in a stable, homogenous inoculant. It should however be noted that mixing and/or blending the $Sb_2O_3$ particles with the particulate FeSi base alloy is not mandatory for achieving the inoculating effect. The particulate FeSi base alloy and $Sb_2O_3$ particles may be added separately but simultaneously to the liquid cast iron.

The addition of $Sb_2O_3$ particles together with FeSi base alloy particles, instead of alloying Sb with the FeSi alloy, provides several advantages. Both the antimony and oxygen of the $Sb_2O_3$ compound is essential for the performance of the inoculant. Another advantage is the good reproducibility of the inoculant composition since the amount and the homogeneity of particulate $Sb_2O_3$ in the inoculant is easily controlled. The importance of controlling the amount of inoculants and having a homogenous composition of the inoculant is evident given the fact that antimony is normally added at a ppm level. Adding an inhomogeneous inoculant may result in wrong amounts of inoculating elements in the cast iron. Still another advantage is the more cost effective production of the inoculant compared to methods involving alloying antimony in a FeSi based alloy.

EXAMPLES

Four inoculation trials were performed out of one ladle of 600 kg molten cast iron treated with magnesium by addition of 1.3 wt % MgFeSi nodularizing alloy. The MgFeSi nodularizing alloy had the following composition by weight: 5.8 wt % Mg, 1 wt % Ca, 1 wt % RE, 0.7 wt % Al, 46 wt % Si, the balance being iron.

The four trials were divided into two repetitions using two different inoculants.

The two inoculants consisted of a ferrosilicon alloy, Inoculant A, containing 71.8 wt % Si, 1.07 wt % Al, 0.97 wt % Ca, 1.63 wt % Ce, the remaining being iron. To one part of Inoculant A it was added 1.2 wt % $Sb_2O_3$ in particulate form, and mechanically mixed to provide the inoculant of the present invention. To another part of Inoculant A it was added 1 wt % FeS and 2 wt % $Fe_2O_3$, and mechanically mixed. This is the inoculant according to WO 99/29911 produced by Elkem AS under trademark Ultraseed®.

The four trials were divided into two repetitions of the two different inoculants. Two trials with added FeS and $Fe_2O_3$ powder to make Ultraseed® inoculant, and two trials with added $Sb_2O_3$ powder to make the inoculant of the present invention.

Table 1 shows an overview of the inoculants used. The amounts of antimony oxide, iron oxide and iron sulphide are based on the total weight of the inoculants.

TABLE 1

| # | Base inoculant | Addition rates (wt %) | | | Reference |
| | | FeS | $Fe_2O_3$ | $Sb_2O_3$ | |
| --- | --- | --- | --- | --- | --- |
| Ladle 1 | Inoculant A | 1% | 2% | — | Ultraseed (Prior art) |
| Ladle 2 | Inoculant A | — | — | 1.2% | $Sb_2O_3$ (Invention) |
| Ladle 3 | Inoculant A | — | — | 1.2% | $Sb_2O_3$ (Invention) |
| Ladle 4 | Inoculant A | 1% | 2% | — | Ultraseed (Prior art) |

Figure 1:
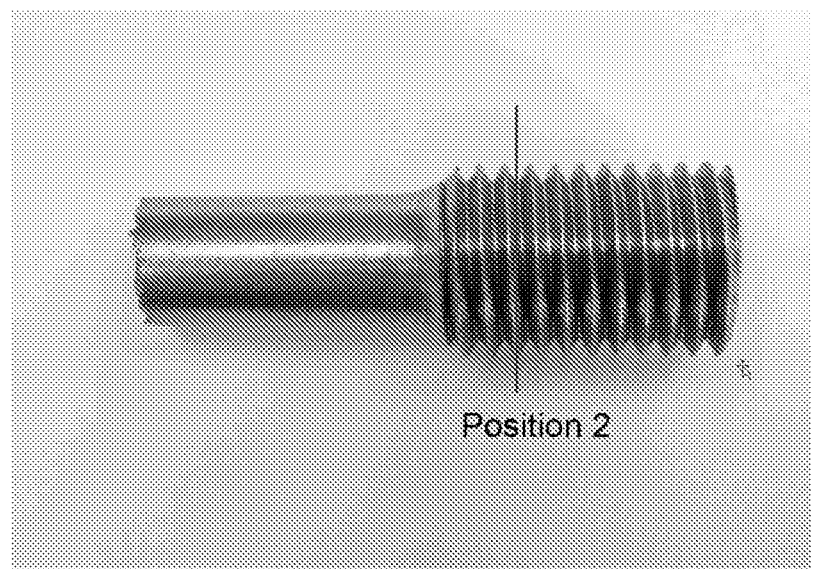
FIG. 1 shows a test bar of iron casting.

The inoculants were added to cast iron melts in an amount of 0.2 wt %. The inoculated cast irons were cast into 28 mm diameter cylindrical test bars. Microstructures were examined in one test bar from each trial. The test bars were cut, prepared and evaluated by image analysis in position 2 shown in FIG. 1. The nodule number (number of nodules/$mm^2$) was determined. The results are shown in FIG. 2.

Figure 2:
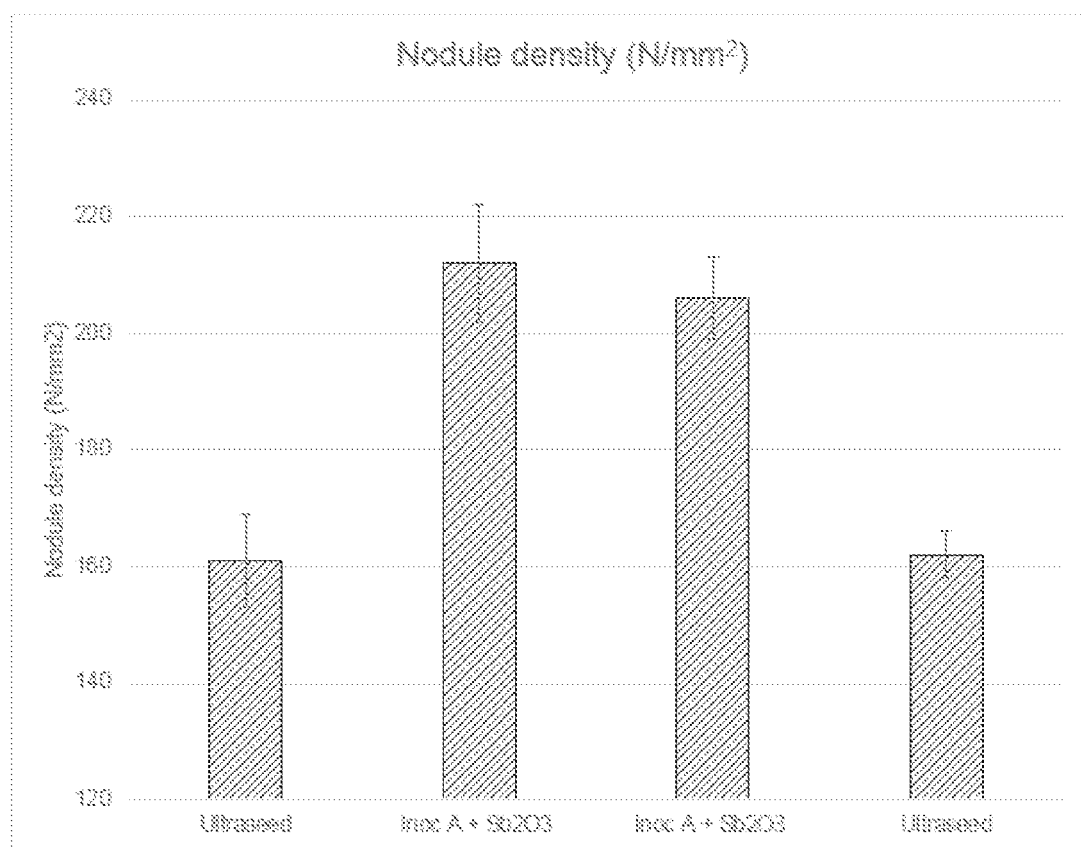
FIG. 2 is a diagram showing nodule number density in cast iron samples.

As can be seen from FIG. 2 the results show a very significant trend in that the cast irons treated with $Sb_2O_3$ containing inoculants have higher nodule number density compared to same cast iron melts treated with the prior art Ultraseed® inoculant.

Having described preferred embodiments of the invention it will be apparent to those skilled in the art that other embodiments incorporating the concepts may be used. These and other examples of the invention illustrated above and in the accompanying drawings are intended by way of example only and the actual scope of the invention is to be determined from the following claims.

The invention claimed is:

1. An inoculant for the manufacture of cast iron with lamellar, compacted or spheroidal graphite wherein said inoculant comprises a particulate ferrosilicon alloy comprising
between about 40 to 80 wt % silicon,
between about 0.1 to 10 wt % calcium,
between 0 and 10% by weight of rare earths, and
up to 5 wt % aluminium the balance being iron and incidental impurities in the ordinary amount,
wherein said inoculant additionally comprises 0.1 to 10 wt % $Sb_2O_3$, based on the total weight of inoculant, where said $Sb_2O_3$ is in particulate form.

2. Inoculant according to claim 1, wherein the ferrosilicon alloy comprises between 45 and 60% by weight of silicon.

3. Inoculant according to claim 1, wherein the ferrosilicon alloy comprises between 60 and 80% by weight of silicon.

4. Inoculant according to claim 1, wherein the ferrosilicon alloy comprises between 0.5 and 5% by weight of calcium.

5. Inoculant according to claim 1, wherein the ferrosilicon alloy comprises between 0.5 and 5% by weight aluminum.

6. Inoculant according to claim 1, wherein the ferrosilicon alloy comprises up to 6% by weight of rare earths.

7. Inoculant according to claim 1, wherein the inoculant comprises 0.2 to 5% by weight of particulate $Sb_2O_3$.

8. Inoculant according to claim 1, wherein the rare earths are cerium and/or lanthanum.

9. Inoculant according to claim 1, wherein the inoculant is in the form of a mixture or blend of the ferrosilicon alloy particles and the $Sb_2O_3$ particles.

10. Inoculant according to claim 1, wherein the inoculant is in the form of agglomerates made from a mixture of the particulate ferrosilicon alloy particles and the $Sb_2O_3$ particles.

11. Inoculant according to claim 1, wherein the inoculant is in the form of briquettes made from a mixture of the particulate ferrosilicon alloy particles and the $Sb_2O_3$ particles.

12. A method for producing an inoculant for the manufacture of cast iron with lamellar, compacted or spheroidal graphite, comprising:
providing a particulate ferrosilicon alloy comprising 40 to 80 wt % silicon, between about 0.1 to 10 wt % calcium, between 0 and 10% by weight of rare earths, and up to 5 wt % aluminium the balance being iron and incidental impurities in the ordinary amount,
mixing with said particulate base alloy 0.1 to 10 wt %, based on the total weight of inoculant, $Sb_2O_3$ particles to produce said inoculant.

13. The inoculant according to claim 1, wherein the rare earths are cerium and/or lanthanum.

14. The method according to claim 12, wherein the rare earths are cerium and/or lanthanum.

* * * * *